(No Model.)

3 Sheets—Sheet 1.

J. A. MENGEL.
POTATO CUTTER AND PLANTER.

No. 583,386.

Patented May 25, 1897.

Witnesses

Inventor

Joseph A. Mengel.
By D. L. Reinohl
Attorney.

(No Model.) 3 Sheets—Sheet 2.
J. A. MENGEL.
POTATO CUTTER AND PLANTER.
No. 583,386. Patented May 25, 1897.
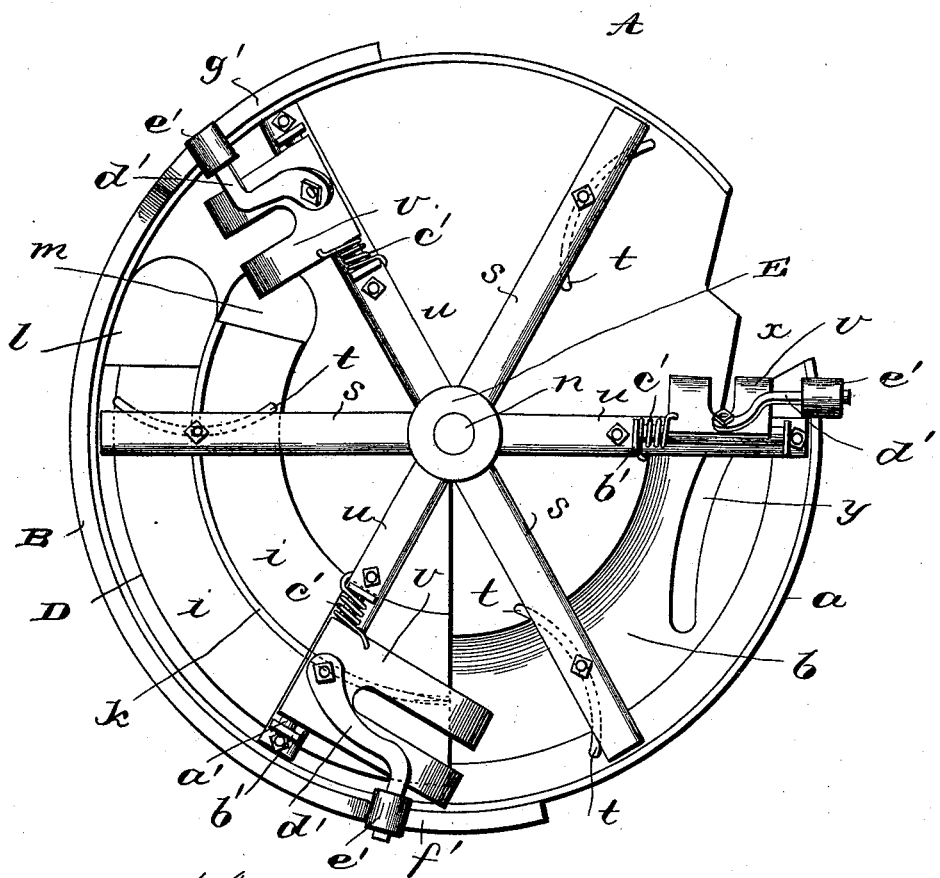
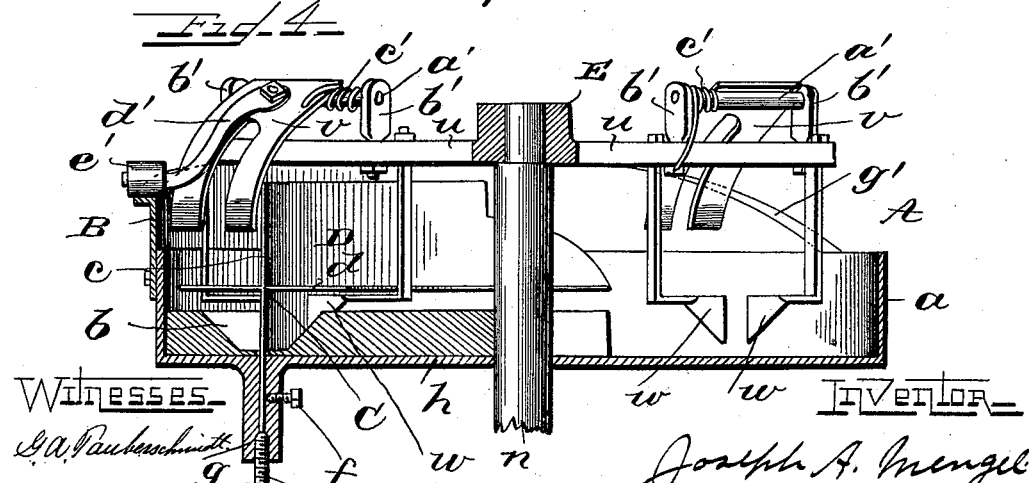

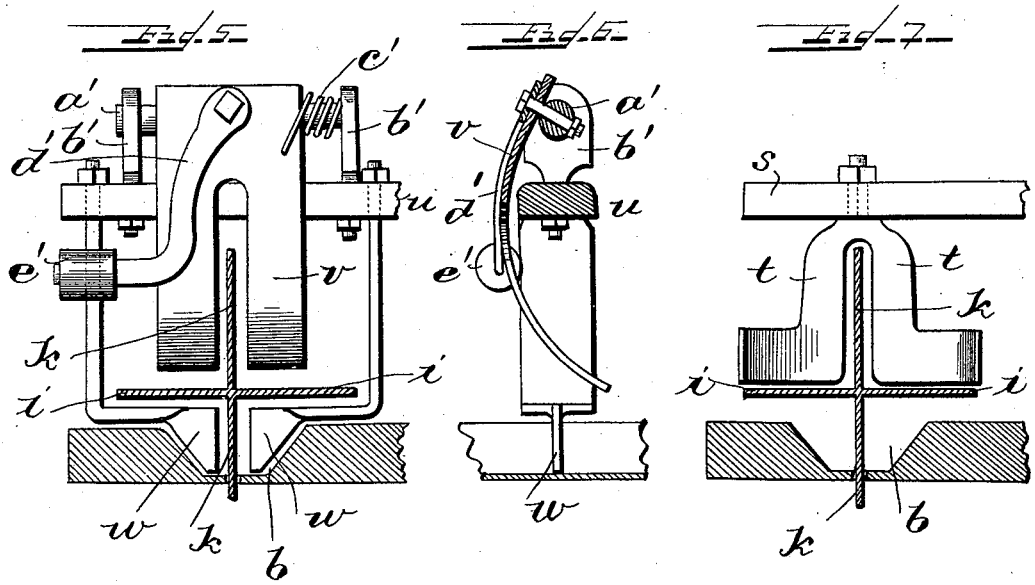
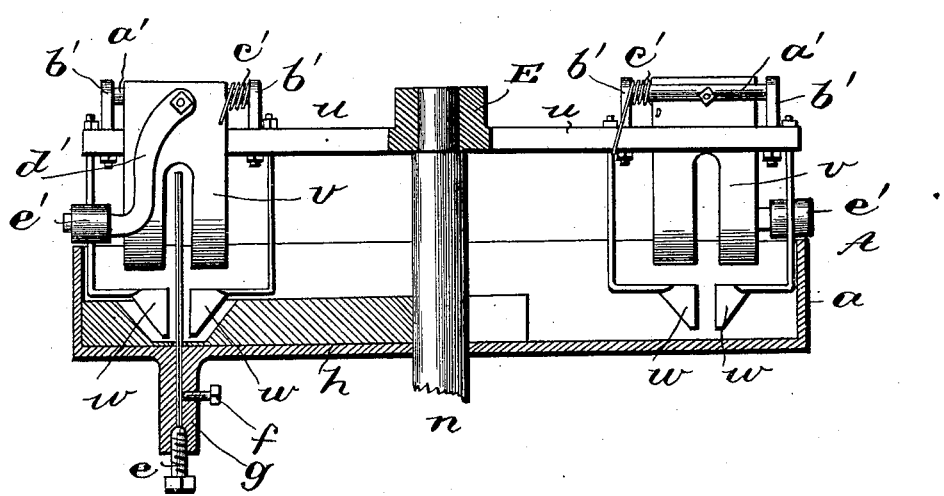

UNITED STATES PATENT OFFICE.

JOSEPH A. MENGEL, OF McKEANSBURG, PENNSYLVANIA.

POTATO CUTTER AND PLANTER.

SPECIFICATION forming part of Letters Patent No. 583,386, dated May 25, 1897.

Application filed August 15, 1896. Serial No. 602,894. (No model.)

*To all whom it may concern:*

Be it known that I, JOSEPH A. MENGEL, a citizen of the United States, residing at McKeansburg, in the county of Schuylkill and State of Pennsylvania, have invented certain new and useful Improvements in Potato Cutters and Planters; and I do hereby declare the following to be a full, clear, and exact description of the invention, such as will enable others skilled in the art to which it appertains to make and use the same.

My present invention relates to potato-planters, has especial reference to means for cutting potatoes into quarters or halves preparatory to supplying them to a planter, and has for its object certain improvements in construction which will be fully disclosed in the following specification and claims.

For the purpose of illustration I have shown my invention applied to the form of potato-planter patented to myself, G. K. Binkley, and G. H. Gerber March 31, 1896, and numbered 557,136, but it may be applied to other forms of planters.

Figure 1:
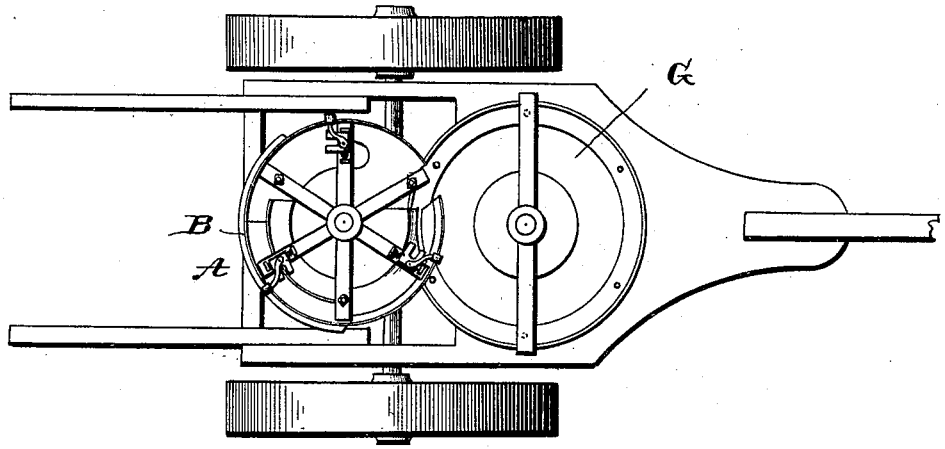
Figure 2:
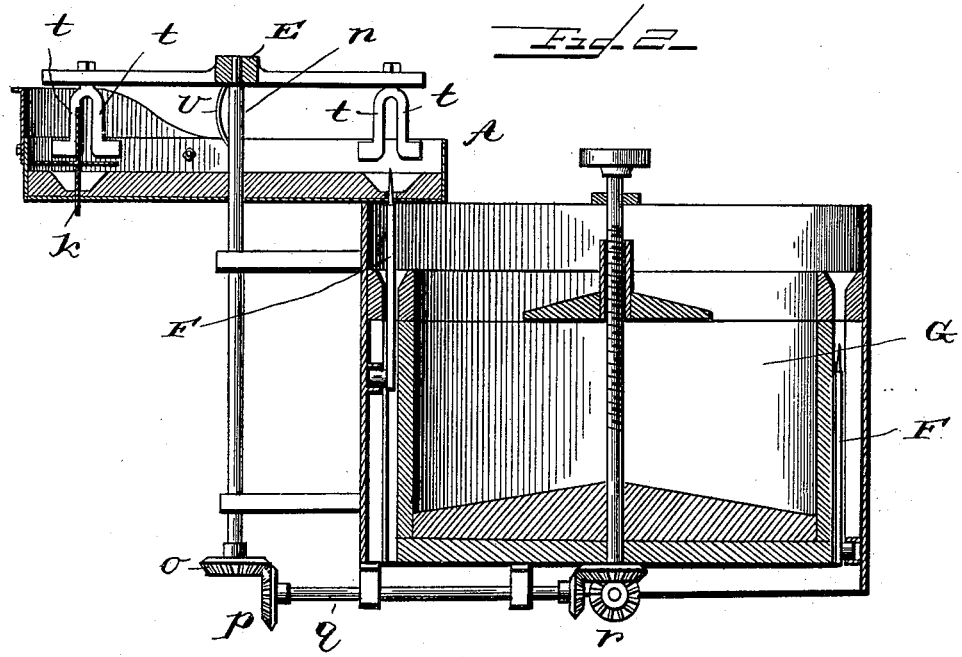

In the accompanying drawings, which form part of this specification, Figure 1 represents a top plan view; Fig. 2, a vertical section of the hopper of the planter and the potato-cutter on an enlarged scale; Fig. 3, a top plan view of the potato-cutter detached from the planter; Fig. 4, a vertical section of the same; Fig. 5, a vertical section showing one of the spring-actuated carriers in elevation; Fig. 6, a vertical transverse section through the same carrier; Fig. 7, a vertical section showing one of the fixed carriers in elevation, and Fig. 8 a vertical section showing the cutting device with the horizontal blades removed and with the cam-track removed from the rim of the body.

Reference being had to the drawings and the letters thereon, A indicates the body of the cutter, cylindrical in form and provided with a sheet-metal rim $a$, on one side of which rim is a detachable cam-track B, and in the bottom is a concentric groove $b$, in which the potatoes to be cut travel to the cutting device C. The cutting device is provided with a vertical blade $c$, which intersects the groove $b$, and with a horizontal blade $d$ when it is desired to quarter or cut the potatoes in four parts, as shown in Figs. 4, 5, 6, and 7, and when it is desired to halve or cut the potatoes in two parts only the horizontal blade $d$ is dispensed with, as shown in Fig. 8, and at such time the cam-track B is also removed from the rim of the body, as shown in the same figure.

The cutting device is vertically adjustable by means of a set-screw $e$ and clamping-screw $f$, which engages a boss $g$ on the under side of the bottom $h$, and into which boss the lower end of the vertical blade $c$ of the cutting device extends, as shown in Figs. 4 and 8, and to the rear end of the horizontal blades $d$ of the cutting device is a separator and support D, having horizontal extensions $i\ i$, which support the parts of the potatoes above the horizontal blades $d$, and vertical extensions $k\ k$, which keep said parts separated as they are moved by the carriers toward the openings $l\ m$ in the bottom, through which the pieces of potato pass to a suitable conductor, (not shown,) by which they are conducted to the furrow in which the potatoes are to be planted. The part D being secured to the cutting device, it is adjusted therewith to allow the parts of the potato below the horizontal blade $d$ to pass under the extensions $i\ i$ as they are moved by carriers toward the openings $l\ m$.

E indicates a spider mounted upon a shaft $n$, at whose lower end is a miter gear-wheel $o$, which engages a like gear-wheel $p$ on the shaft $q$ and is propelled to revolve the spider by a gear-wheel $r$ or by any suitable driving mechanism, as shown in Fig. 2. To each alternate arm $s$ of the spider are attached fixed carriers $t$, which extend down into the body of the cutter, and to the arms $u$ are attached laterally-movable carriers $v$ and fixed carriers $w\ w$.

When the cutter is applied to the potato-planter hereinbefore referred to, the spears F enter opening $x$ in the rim or body and the slot $y$ in the bottom and deposit the potato from the hopper G into the groove $b$, when the movable carrier $v$ and the fixed carriers $w\ w$ on the arm $u$, passing that part of the cutter, push the potato along in the groove $b$ against the cutting device C and sever the potato into halves or quarters, as may be determined upon. The movable carriers $v$ are secured at their upper ends to an axiallymovable shaft $a'$, supported in bearings $b'$ $b'$. On the upper side of the arms $u$ and one side of the carriers is attached a spring $c'$, whose opposite end engages the arm $u$, and from the opposite side of the carrier extends an arm $d'$, provided with a friction-roll $e'$, which engages the cam or inclined surface $f'$ of the cam-track B as the carrier approaches the cutting device and raises the carrier by throwing it back to permit the carrier to pass over the upper vertical extension $k$ of the separator and support D, as shown in Figs. 3 and 4. The spring $c'$ presses the carrier and holds it to its place while the potato is being cut, and after the carrier has reached the incline $g'$ restores the carrier to its normal position.

After the potato has been cut the parts of the potato below the extensions $i$ $i$ of the part D are moved along by the fixed carriers $w$ $w$ on the arms $u$, which pass under said extensions, while the parts of the potato above the extensions are moved along by the fixed carriers $t$ on the arms $s$, which pass above the extensions.

In Fig. 1 of the drawings the cutter is shown placed in the rear of the hopper of a planter and is supported on the frame thereof, but it may be changed to suit different machines. It will also be observed that the openings $l$ $m$ in the bottom of the cutter are placed in different planes to separate the seed as they are deposited in the furrows.

Having thus fully described my invention, what I claim is—

1. A potato-cutter having a receptacle provided with a cylindrical sheet-metal rim, a bottom with a concentric groove therein, a revoluble spider having carriers extending downward from the arms thereof and a vertical cutting device in said groove and in the path of rotation of said carriers.

2. A potato-cutter having a receptacle provided with a cylindrical sheet-metal rim, a bottom with a concentric groove and a discharge-opening therein, a revoluble spider having carriers extending downward from the arms thereof and provided with vertical slots, and a cutting device in said groove and in the path of rotation of said carriers, and straddled thereby.

3. A potato-cutter having a receptacle provided with a cylindrical sheet-metal rim, a bottom with a concentric groove and a discharge-opening therein, a revoluble spider having spring-actuated carriers supported by the arms thereof and a cutting device in said groove and provided with vertical and horizontal blades.

4. A potato-cutter having a receptacle provided with a cylindrical sheet-metal rim, a bottom with a concentric groove therein, a revoluble spider supporting downwardly-extending carriers, a cutting device in said groove and a cam-track on the rim of the body.

5. A potato-cutter having a receptacle provided with a cylindrical sheet-metal rim, a bottom with a concentric groove therein, a vertically-adjustable cutter in said groove and a revoluble spider supporting downwardly-extending carriers.

6. A potato-cutter having a receptacle provided with a cylindrical sheet-metal rim, a bottom with a concentric groove therein, a revoluble spider, carriers extending from the under side of the arms of the spider, a cutting device in said groove and provided with vertical and horizontal blades and a horizontal support adjacent to the cutting device.

7. A potato-cutter having a receptacle provided with a cylindrical sheet-metal rim, a bottom with a concentric groove therein, a cutting device having vertical and horizontal blades, a revoluble spider having laterally-movable carriers secured to arms thereof, a cam-track by which said carriers are moved laterally and springs for returning the carriers.

In testimony whereof I affix my signature in presence of two witnesses.

JOSEPH A. MENGEL.

Witnesses:
JNO. S. ZULICK,
T. B. ZULICK.